United States Patent
Vanolst et al.

(10) Patent No.: US 12,398,993 B2
(45) Date of Patent: Aug. 26, 2025

(54) DEVICE, METHOD AND SYSTEM FOR DETERMINING POSITION OF A MAGNET

(71) Applicant: Melexis Technologies SA, Bevaix (CH)

(72) Inventors: Jelle Vanolst, Tessenderlo (BE); Jerome Degois, Paris la Defense (FR); Nick Czarnecki, Novi, MI (US)

(73) Assignee: MELEXIS TECHNOLOGIES SA, Bevaix (CH)

( * ) Notice: Subject to any disclaimer, the term of this patent is extended or adjusted under 35 U.S.C. 154(b) by 326 days.

(21) Appl. No.: 17/956,320

(22) Filed: Sep. 29, 2022

(65) Prior Publication Data
US 2023/0107459 A1   Apr. 6, 2023

Related U.S. Application Data

(60) Provisional application No. 63/249,731, filed on Sep. 29, 2021.

(51) Int. Cl.
G01B 7/00   (2006.01)
(52) U.S. Cl.
CPC .................... *G01B 7/003* (2013.01)
(58) Field of Classification Search
None
See application file for complete search history.

(56) References Cited

U.S. PATENT DOCUMENTS

| | | | |
|---|---|---|---|
| 7,388,574 B2 | 6/2008 | Takatsuka et al. | |
| 2009/0045807 A1 | 2/2009 | Nishida et al. | |
| 2017/0089726 A1 | 3/2017 | Scherr et al. | |
| 2020/0139230 A1* | 5/2020 | Nelson | G06F 3/038 |
| 2021/0110239 A1 | 4/2021 | Heinz et al. | |

FOREIGN PATENT DOCUMENTS

| | | |
|---|---|---|
| EP | 3783316 A1 | 2/2021 |
| EP | 3875915 A1 | 9/2021 |
| JP | 2003196019 A | 7/2003 |

OTHER PUBLICATIONS

Search Report from corresponding European Application No. 21200020.2, Mar. 14, 2022.

\* cited by examiner

*Primary Examiner* — Walter L Lindsay, Jr.
*Assistant Examiner* — Geoffrey T Evans
(74) *Attorney, Agent, or Firm* — Workman Nydegger (57) ABSTRACT

A position sensor device for determining a two-dimensional position of a magnet which is movable in a plane, and that generates a magnetic field; the position sensor device includes: a semiconductor substrate having a plurality of magnetic sensors configured for determining three orthogonal magnetic field components (Bx, By, Bz) at a single location. The semiconductor substrate further includes a processing circuit configured for determining the two-dimensional position (R,θ; X,Y) based on the three orthogonal magnetic field components. A thumbstick assembly has such a position device. A method is provided for determining the two-dimensional position.

12 Claims, 9 Drawing Sheets

$x = R*\cos(\theta)$
$y = R*\sin(\theta)$ $R = \sqrt{x^2+y^2}$
$\theta = \arctan(y/x)$ or $\text{atan2}(y,x)$

SOLUTION:

$$R = K1*\arccos(K2*(Bz-K3)) \quad [1]$$

$$R = K4*\arcsin(\sqrt{sqr(Bx) + sqr(By)}) \quad [2]$$

$$R = K5*atan2[\sqrt{sqr(Bx) + sqr(By)}, K2*(Bz-K3)] \quad [3]$$

$$R = K5*atan2[\sqrt{sqr(Bx) + sqr(By)}, Bz] \quad [4]$$

$$\theta_A = atan2(By, Bx) \quad [5]$$

DEVICE, METHOD AND SYSTEM FOR DETERMINING POSITION OF A MAGNET

FIELD OF THE INVENTION

The present invention relates in general to the field of magnetic position sensor systems, devices and methods, and more in particular to magnetic position sensor devices, systems and methods for determining a 2D position of a magnet that is movable in a 2D-plane. The present invention is also related to a position sensor system wherein said magnet is connected to a thumbstick.

BACKGROUND OF THE INVENTION

Magnetic position sensor systems, in particular linear or angular position sensor systems are known in the art. Many variants of position sensor systems exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against positioning errors, being highly robust against an external disturbance field, providing redundancy, being able to detect an error, being able to detect and correct an error, having a good signal-to-noise ratio (SNR), having only one degree of freedom (translation or rotation), having two degrees of freedom (e.g. one translation and one rotation, or two rotations), etc.

In many known systems, the system has only one degree of motional freedom, e.g. rotation about a single axis, or translation along a single axis.

Magnetic position sensor systems where the magnet has at least two degrees of freedom, are also known in the art, for example from EP3875915(A1) disclosing a magnet movable along an axis and independently rotatable about said axis; or from US2021/0110239(A1) disclosing a circuit comprising at least one trained neural network for determining information about a position, attitude, or orientation of a magnet. These examples show that position sensor systems wherein the magnet has at least 2 degrees of freedom are much more complicated than systems having only one degree of freedom.

There is always room for improvements or alternatives.

SUMMARY OF THE INVENTION

It is an object of embodiments of the present invention to provide a position sensor device, a position sensor system, and a method for determining a two-dimensional position of a magnet, which is movable in a two-dimensional plane. The two-dimensional position may for example be expressed in the form of a distance D relative to a reference position and an angle θ relative to a reference direction, or in the form of two Cartesian coordinates X, Y.

It is an object of particular embodiments of the present invention to provide a position sensor device, a position sensor system, and a method for determining said position using a relatively small amount of sensor elements.

It is an object of particular embodiments of the present invention to provide a position sensor device, a position sensor system, and a method for determining said position in a simple manner, e.g. using relatively simple arithmetic (no Neural Network).

It is an object of particular embodiments of the present invention to provide a position sensor device, a position sensor system, and a method for determining said position using one or more analytical formulas.

It is an object of particular embodiments of the present invention to provide a position sensor device, a position sensor system, and a method for determining said position in a manner that requires only a small semiconductor substrate, e.g. smaller than 4.0 mm$^2$, or smaller than 3.5 mm$^2$, or smaller than 3.0 mm$^2$, or smaller than 2.5 mm$^2$, or smaller than 2.0 mm$^2$, or smaller than 1.5 mm$^2$.

It is an object of particular embodiments of the present invention to provide a position sensor device, a position sensor system, and a method for determining said position in a manner which is highly insensitive to temperature variations and/or demagnetization.

These and other objectives are accomplished by embodiments of the present invention.

According to a first aspect, the present invention provides a position sensor device for determining a two-dimensional position (e.g. R,θ or X,Y) of a magnet which is movable in a plane, and that generates a magnetic field; the position sensor device comprising: a semiconductor substrate comprising a plurality of magnetic sensors configured for determining three orthogonal magnetic field components (e.g. Bx, By, Bz) at a single location; and wherein the semiconductor substrate further comprises a processing circuit configured for determining said two-dimensional position based on (e.g. based solely on) said three orthogonal magnetic field components.

In an embodiment, the plurality of magnetic sensor elements comprise four horizontal Hall elements arranged on a virtual circle, near the periphery of an integrated magnetic flux concentrator (IMC), e.g. having a disk shape.

In an embodiment, the plurality of magnetic sensor elements comprises one horizontal Hall element having an axis of maximum sensitivity in a first direction (e.g. Z) oriented perpendicular to the semiconductor substrate; and two vertical Hall elements having an axis of maximum sensitivity in a second direction (e.g. X) parallel to the semiconductor substrate; and two vertical Hall elements having an axis of maximum sensitivity oriented in a third direction (e.g. Y) parallel to the semiconductor surface and perpendicular to the second direction (e.g. X).

In case the sensor structure contains one horizontal Hall element and two vertical Hall elements, the vertical Hall elements are preferably arranged on opposite sides of the horizontal Hall element such that the horizontal Hall element is situated in the middle between them, and preferably the signals from these vertical Hall elements are added, in order to increase the signal-to-noise ratio (SNR).

In an embodiment, the two-dimensional position is determined as a lateral distance (e.g. R) from a predefined position; and as an azimuth angle (e.g. θ) with respect to a predefined direction (e.g. X); and wherein said distance is determined as a first function of a ratio of a first numerator and a first denominator, and at least one of the following options: i) wherein each of the first numerator and the first denominator are a function or expression of at least one magnetic field component (e.g. Bx, By, Bz); ii) wherein the first numerator is a function of the in-plane magnetic field components (e.g. Bx, By), and the denominator is a function of the out-of-plane magnetic field component (e.g. Bz); iii) wherein the first numerator is a function of the sum of squares of the in-plane magnetic field components (e.g. Bx, By), and the denominator is a function of the out-of-plane magnetic field component (e.g. Bz); and wherein said azimuth angle (e.g. θ) is determined as a second function of a ratio of a second numerator and a second denominator, and at least one of the following options: iv) wherein each of the second numerator and the second denominator is a function or expression of at least one in-plane magnetic field component (e.g. Bx, By); v) wherein the second numerator is one (e.g. Bx) of the in-plane magnetic field components, and the second denominator is the other (e.g. By) of said in-plane magnetic field components (e.g. Bx, By).

In an embodiment, the two-dimensional position is determined as a lateral distance R from a predefined position; and as an azimuth angle θ with respect to a predefined direction (e.g. X); wherein said distance R is determined in accordance with the following formula:

R=K5*atan2 [√(sqr(Bx)+sqr(By)), K2*(Bz-K3)], wherein K2, K3, K5 are predefined constants; and wherein said azimuth angle θ is determined in accordance with the following formula: θ=atan2(By, Bx).

It is an advantage that the azimuth angle can be calculated as a ratio of two magnetic field components, because this ratio is highly insensitive to demagnetisation, temperature variations, axial position offset.

It is an advantage of this embodiment that the result is more accurate, at the expensive of a slightly more complex formula, including a square root of a sum of two squares. It is an advantage that the formula for the distance is based on a ratio (implicit in the atan2-function) of a numerator and a denominator, both of which vary in the same way with temperature, demagnetization, etc.

If desired, the values R and θ can be converted into Cartesian coordinates (X, Y) using the following formulas: X=R*cos(θ), Y=R*sin(θ).

In a particular embodiment, the value of K2 equals 1.0 and the value of K3 equals 0.0, in which case the formula can be simplified to: R=K5*atan2[√(sqr(Bx)+sqr(By)), Bz]. This formula is particular advantageous, and provides highly accurate results, moreover over a relatively large range up to 2.0 times or even up to 2.5 times the radius of the magnet.

In an embodiment, the two-dimensional position is determined as a lateral distance R from a predefined position; and as an azimuth angle θ with respect to a predefined direction (e.g. X); wherein said distance R is determined in accordance with the following formula: R=K1*arccos (K2*(Bz-K3)), wherein K1, K2, K3 are predefined constants which may be determined by design, by simulation or by calibration; and wherein said azimuth angle θ is determined in accordance with the following formula:

θ=atan2(By,Bx).

It is an advantage of the distance-formula that it can be used over a wider range.

It is an advantage that the azimuth angle can be calculated as a ratio of two magnetic field components, because this ratio is highly insensitive to demagnetisation, temperature variations, axial position offset. If desired, the values D and θ can be converted into Cartesian coordinates (X, Y) using the following formulas: X=D*cos (θ), Y=D*sin (θ).

In an embodiment, the magnet is a two-pole, axially magnetized, cylindrical magnet.

It is an advantage of using a cylindrical magnet which is axially magnetized, that rotation of the magnet about its magnetization axis does not change the magnetic field.

In an embodiment, the magnet can be laterally moved or shifted in a plane, and its axis is perpendicular to the semiconductor surface.

For completeness, it is noted that the magnet may or may not be rotatable about its axis, but since the magnet is axially magnetized, this will not change the magnetic field.

According to a second aspect, the present invention also provides a position sensor system, comprising: a position sensor device according to the first aspect; said magnet, movably mounted in a plane parallel to the semiconductor substrate of the position sensor device.

In an embodiment, the position sensor system further comprises a mechanical assembly comprising or connected to said magnet, and configured for allowing the magnet to move in a direction parallel to said semiconductor substrate, while keeping its axis substantially perpendicular to the semiconductor substrate.

The mechanical assembly may comprise an elastic material, e.g. a silicone or a polymer. The mechanical assembly may further comprise a lever or a thumbstick.

According to a third aspect, the present invention also provides a thumbstick assembly comprising a position sensor system according to the second aspect, wherein the mechanical assembly further comprises a thumbstick.

According to a fourth aspect, the present invention also provides a method of determining a two-dimensional position (e.g. R, θ; or X, Y) of a magnet which is movable in a plane parallel to a semiconductor substrate, the method comprising the steps of: a) measuring three orthogonal magnetic field components (e.g. Bx, By, Bz) at a single location on said semiconductor substrate; b) determining said two-dimensional position (e.g. R, θ; or X, Y) based on (e.g. based solely on) said three orthogonal magnetic field components (e.g. Bx, By, Bz).

In an embodiment, step b) comprises: i) determining a lateral distance R from a predefined reference position in accordance with the following formula: R=K1*arccos (K2*(Bz-K3)), wherein K1, K2, K3 are predefined constants; and ii) determining an azimuth angle θ with respect to a predefined direction (e.g. X), in accordance with the following formula: θ=atan2(By, Bx).

The values of the predefined constants may be determined by design, by simulation or by calibration, and may be hardcoded in a software program, or may be stored as parameters in a non-volatile memory during calibration, from which the values may be retrieved during actual use of the sensor device. This also applies when using other formulas.

In an embodiment, step b) comprises: i) determining a lateral distance R from a predefined reference position in accordance with the following formula: R=K4*arcsin(√[sqr(Bx)+sqr(By)]), wherein K4 is a constant; and ii) determining an azimuth angle θ with respect to a predefined direction (e.g. X), in accordance with the following formula: 0=atan2 (By, Bx).

The same note regarding the predefined constants is also applicable here.

In an embodiment, step b) comprises: i) determining a lateral distance R from a predefined reference position in accordance with the following formula:

R=K5*atan2(√ [sqr(Bx)+sqr(By)], K2*(Bz-K3)), wherein K2, K3, K5 are predefined constants; and ii) determining an azimuth angle θ with respect to a predefined direction (e.g. X), in accordance with the following formula: 0=atan2(By, Bx).

The same note regarding the predefined constants is also applicable here.

In a particular embodiment, the value of K2 equals 1.0 and the value of K3 equals 0.0, in which case the formula can be simplified to: R=K5*atan2 [√ (sqr(Bx)+sqr(By)), Bz].

According to a fifth aspect, the present invention also provides a method of determining a two-dimensional position (e.g. R, θ or X, Y) of a magnet which is movable in a plane parallel to a semiconductor substrate, the method comprising the steps of: a) measuring a first magnetic field component (e.g. Bz1) oriented in a direction perpendicular to the semiconductor substrate, at a first sensor location on said semiconductor substrate; b) measuring a second magnetic field component (e.g. Bz2) oriented in said direction perpendicular to the semiconductor substrate, at a second sensor location different from the first sensor location; c) determining which of the first and second magnetic field component (e.g. Bz1, Bz2) is largest, and selecting the corresponding position as the selected sensor position; d) measuring at the selected sensor position also a third magnetic field component (e.g. Bx) parallel to the semiconductor substrate, and a fourth magnetic field component (e.g. By) parallel to the semiconductor substrate and perpendicular to the third magnetic field component (e.g. Bx); e) determining a two-dimensional offset of the magnet relative to the selected sensor position based on the largest of the first (e.g. Bz1) and second magnetic field component (e.g. Bz2), and based on the third and fourth field components (e.g. Bx, By); f) determining the two-dimensional position (e.g. R, θ; or X, Y) of the magnet relative to the sensor device by combining said two-dimensional offset with the selected sensor position.

Step f) may comprise determining said two-dimensional position using a method according to the fourth aspect.

In preferred embodiments, the position sensor device is an integrated semiconductor device comprising a semiconductor substrate, for example a silicon substrate comprising a plurality of magnetic sensors, and the virtual plane in which the magnet is movable is preferably a plane parallel to this semiconductor substrate, located at a predefined distance in the range from 1.0 to 8.0 mm from the semiconductor substrate, e.g. at a distance of about 3.5 mm from said substrate.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 4(a) gives an impression of the orientation of the magnetic field lines of the magnetic field created by the magnet. The field has circular symmetry.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "magnetic sensor device" or "sensor device" refers to a device comprising at least one "magnetic sensor" or at least one magnetic "sensor element", preferably integrated in a semiconductor substrate. The sensor device may be comprised in a package, also called "chip", although that is not absolutely required.

In this document, the term "sensor element" or "magnetic sensor element" or "magnetic sensor" can refer to a component or a group of components or a sub-circuit or a structure capable of measuring a magnetic quantity, such as for example a magneto-resistive element, a GMR element, an XMR element, a horizontal Hall plate, a vertical Hall plate, a Wheatstone-bridge containing at least one (but preferably four) magneto-resistive elements, etc. or combinations hereof.

In certain embodiments of the present invention, the term "magnetic sensor" or "magnetic sensor structure" may refer to an arrangement comprising one or more integrated magnetic concentrators (IMC), also known as integrated flux concentrators, and one or more horizontal Hall elements arranged near the periphery of the IMC, for example a disk shaped IMC with two horizontal Hall elements 180° spaced from each other, or with four horizontal Hall elements 90° spaced from each other.

In this document, the expression "in-plane component of a magnetic field vector" and "projection of the magnetic field vector in the sensor plane" mean the same. If the sensor device is or comprises a semiconductor substrate, this also means a "magnetic field component parallel to the semiconductor plane". These components may be labelled Bx, By.

In this document, the expression "out-of-plane component of a vector" and "Z component of the vector" and "projection of the vector on an axis perpendicular to the sensor plane" mean the same. This component may be labelled Bz.

Embodiments of the present invention are typically described using an orthogonal coordinate system which is fixed to the sensor device, and having three axes X, Y, Z, where the X and Y axis are parallel to the substrate, and the Z-axis is perpendicular to the substrate.

In this application, horizontal Hall plates are typically referred to by H1, H2, etc., signals from these horizontal Hall plates are typically referred to by h1, h2, etc., vertical Hall plates are typically referred to by V1, V2, etc., and signals from these vertical Hall plates are typically referred to by v1, v2, etc.

In the context of the present invention, the formulas arctan(x/y), atan2(x,y), arccot(y/x) are considered to be equivalent.

The present invention is related to magnetic position sensor systems, devices and methods for determining a 2-dimensional position of a magnet that is movable in a 2D-plane. The present invention is also related to a position sensor system wherein said magnet is connected to a thumbstick.

Referring to the Figures.

Figure 1:
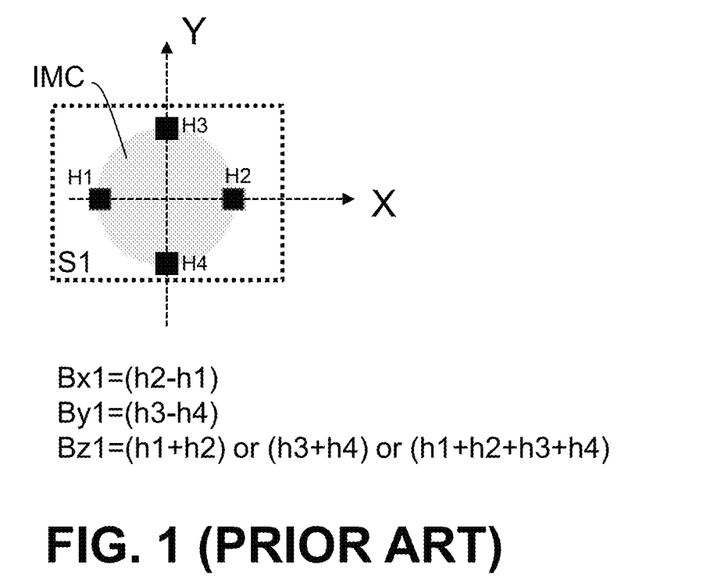
FIG. 1 is a schematic block-diagram of a sensor structure (also referred to herein as a "3D magnetic pixel") as may be used in embodiments of the present invention. The sensor structure comprises an integrated magnetic flux concentrator (IMC) and four horizontal Hall elements arranged near the periphery of the IMC, angularly spaced by multiples of 90°.

FIG. 1 shows a sensor structure comprising an integrated magnetic concentrator (IMC)-structure and four horizontal Hall elements H1 to H4, as can be used in embodiments of the present invention. The four horizontal Hall elements are arranged near a periphery of the integrated magnetic concentrator IMC, and are angularly spaced apart by multiples of 90°. Two of the Hall elements are located on the X-axis, the other two elements are located on the Y-axis perpendicular to the X-axis.

Such a sensor structure is for example described in EP3783316(A1), and hence need not be explained in more detail here. In order to appreciate the present invention, it suffices to say that the IMC may be a circular disk having a diameter in the range from about 150 to about 250 μm, or from about 175 to about 225 μm; and that this sensor structure is capable of measuring a magnetic field component Bx1 oriented in the X direction, a magnetic field component By1 oriented in the Y-direction, and a magnetic field component Bz1 oriented in the Z direction, perpendicular to X and Y.

It is noted that the magnetic field components measured in this way correspond to values of the magnetic field at the centre of the disk. In other words, this structure allows to measure Bx1, By1 and Bz1 at a single sensor location situated at the centre of the disk.

Figure 2:
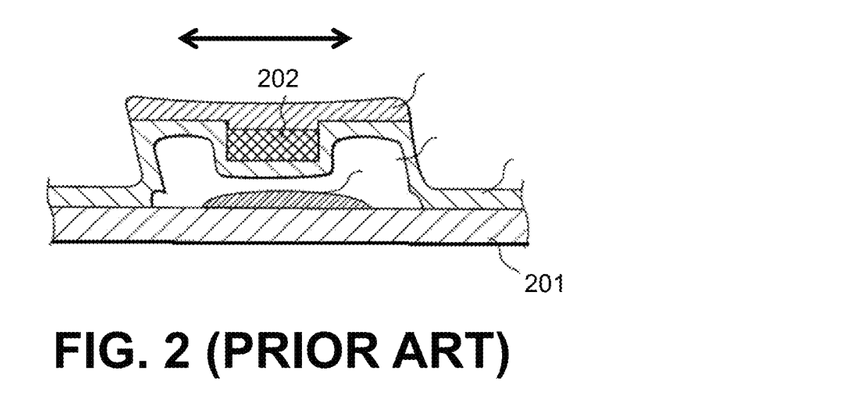
FIG. 2 shows a cross-sectional view of a structure of a pointing device, known in the art. The structure contains a magnet which is movable in a plane parallel to a substrate.

FIG. 2 is a replica of FIG. 12A of U.S. Pat. No. 7,388,574(B2) and shows a cross-sectional view of a structure of a pointing device. The structure contains a magnet 202 which is movable in a plane parallel to a substrate 201. While FIG. 2 shows movability only in the Left-Right direction, when this structure has a circular shape, it allows a two-dimensional movement in a plane parallel to the substrate 201. This structure is provided as an example of a possible mechanical arrangement of a magnet relative to a sensor device, but the present invention is not limited to this particular example, and other suitable mechanical arrangements can also be used.

Figure 3A:
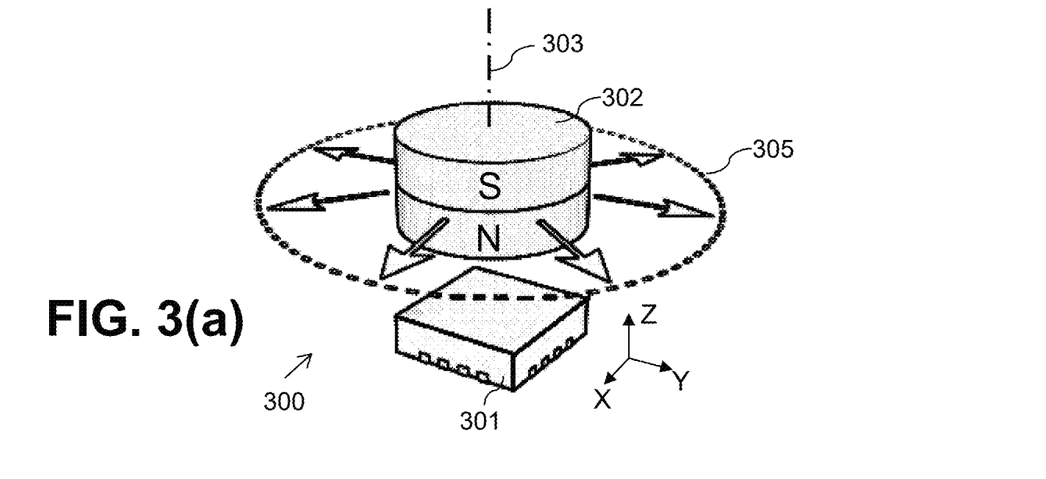
FIG. 3(a) is a schematic representation of a position sensor system comprising a sensor device and a magnet. The sensor device comprises a semiconductor substrate, and the magnet is movable in a plane parallel to the semiconductor substrate. A reference frame with three orthogonal axes XYZ is connected to the semiconductor device. A reference frame with three orthogonal axes UVW is connected to the magnet.

FIG. 3(a) is a schematic representation of a position sensor system 300 comprising a sensor device 301 and a magnet 302. The sensor device 301 comprises a semiconductor substrate, e.g. a silicon substrate, comprising a sensor structure and a processing circuit, as will be described in more detail further. The magnet 302 is preferably an axially magnetized disk magnet, oriented such that its main axis 303 is perpendicular to the semiconductor substrate.

The magnet 302 is movable in two directions in a plane (e.g. a virtual plane) parallel to the semiconductor substrate, as suggested by the arrows of FIG. 3(a). This can be achieved for example by mounting the magnet in an assembly as shown in FIG. 2, but the present invention is not limited to this particular assembly, and other mechanical mounting techniques or mounting structures that allow the magnet 302 to move in a plane parallel to the sensor device, can also be used.

Figure 3B:
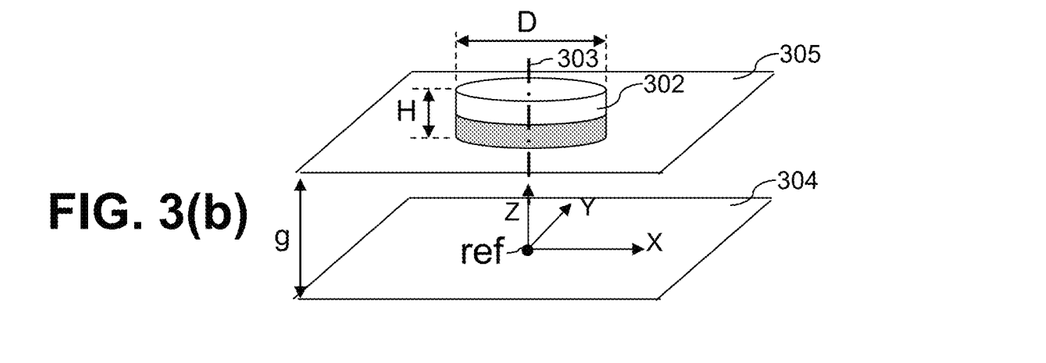
FIG. 3(b) is a schematic representation of the relative positon of the magnet and a reference position in a plane parallel to the magnet.

FIG. 3(b) is a schematic representation of the positon of the magnet 302 relative to the semiconductor substrate 304 of the sensor device. As mentioned above, three orthogonal axes X, Y, Z are fixedly connected to the semiconductor substrate 304. The X and Y axes are parallel to the semiconductor substrate. The Z-axis is oriented perpendicular to this substrate. The magnet is located at a distance "g" from the semiconductor substrate. When the magnet is in its "default position", its axis 303 passes through the reference point "ref" with coordinates (X=0, Y=0).

The magnet 302 preferably has a cylindrical shape with a height "H" and an outer diameter "D". The magnet 302 may have a rectangular cross section in a plane containing the axis 303 (see e.g. FIG. 4(a)), or the cross section may be rectangular with rounded corners. The height H may be a value in the range from 0.6 to In envisioned applications, the magnet may have an outer diameter "D" in the range from 2.0 mm to 8 mm, or from 3.0 mm to 6.0 mm, e.g. equal to about 4.0 mm, or equal to about 5.0 mm. The magnet may have a height "H" in the range from 0.5 mm to 1.5 mm, e.g. equal to about 0.8 mm, or equal to about 1.0 mm, or equal to about 1.2 mm. The distance "g" between the semiconductor substrate 304 and the magnet 302 may be value in the range from 1.0 mm to 8.0 mm, or from 2.0 to 6.0 mm, e.g. equal to about 3.5 mm.

Figure 4A:
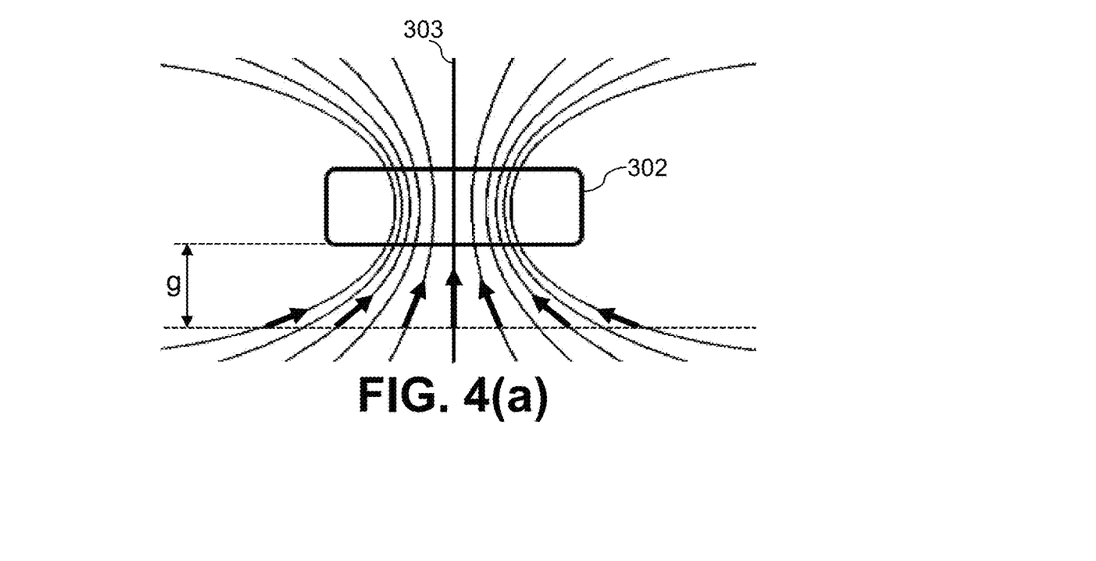
FIG. 4(a) shows a cross section through a plane containing the central axis of the magnet. This Figure also gives a rough impression of the size and orientation of the magnetic field vectors at various positions in a plane parallel to the magnet.

For completeness it is noted that the magnet 302 may or may not be able to rotate about its axis 303, but the magnetic field will not change due to such rotation (see also FIG. 4(a)). The magnet can be made of any suitable material, e.g. Ferrite, SmCo, NdFeB, or plastic bonded magnets.

Figure 3C:
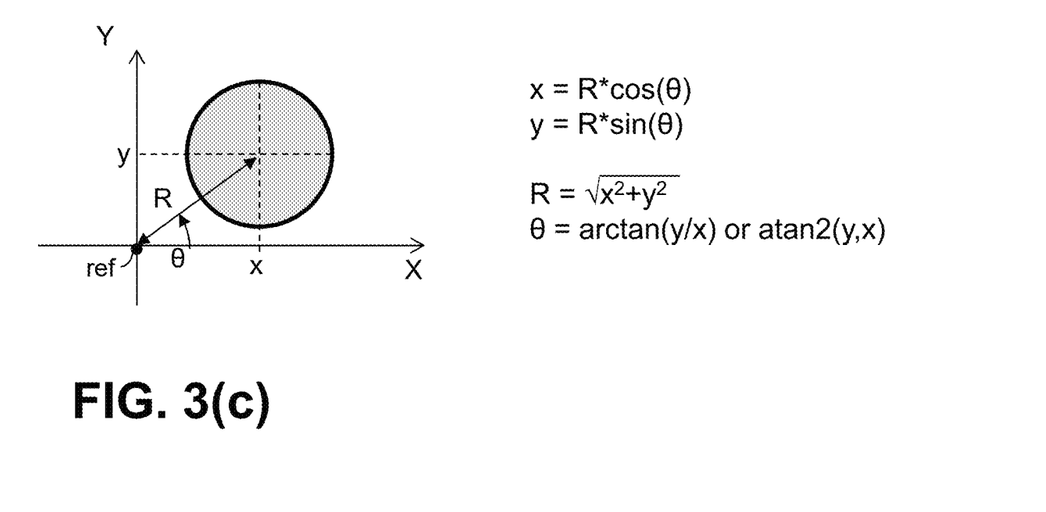
FIG. 3(c) is a schematic representation (in top view) showing that the 2D position of the magnet relative to the sensor device can be indicated for example using Polar coordinates (R,θ) or using Cartesian coordinates (x,y). Formulas for converting these coordinates are shown.

FIG. 3(c) is a schematic representation (in top view) of an arrangement in which the magnet 302 is offset from its reference position "ref". Since the magnet moves in a virtual plane 305 at distance "g" from the semiconductor substrate 304, its Z-coordinate is known (and fixed). The two-dimensional position of the magnet 302 in the plane 305 relative to the axes X, Y of the sensor device can be indicated for example using Polar coordinates (R, θ), or using Cartesian coordinates (x, y). Formulas for converting Polar coordinates into Cartesian coordinates, or vice versa, are shown. Thus, the position of the magnet 302 is uniquely defined if at least one set of Coordinates are known.

The inventors of the present invention were confronted with the specific task of designing the sensor device that it is capable of determining the two-dimensional position of the magnet relative to the sensor device. More specifically, they had to find a suitable sensor structure for measuring characteristics of the magnetic field generated by the magnet 302 at specific places, and of finding a relationship (e.g., functions or formulas) between these characteristics and the position, from which the above mentioned coordinates (R, θ) or (x, y) can be derived. Preferably, of course, the functions are as simple as possible, easy to calculate, and provide accurate results over a relatively large range.

FIG. 4(a) gives an impression of the orientation of the magnetic field lines of the magnetic field created by the magnet 302. Since the magnet is axially magnetized, and has a cylindrical shape, e.g. a disk shape (with sharp edges or with rounded edges), the magnetic field has circular symmetry about the central axis 303 of the magnet 302. FIG. 4(a) shows a cross section through a plane containing the central axis 303 of the magnet, which coincides with one of the field lines. This Figure also gives a rough impression of the size and orientation of the magnetic field vectors at various positions in a plane at a predefined distance "g" from the magnet, which is also the location of the semiconductor substrate.

Figure 4B:
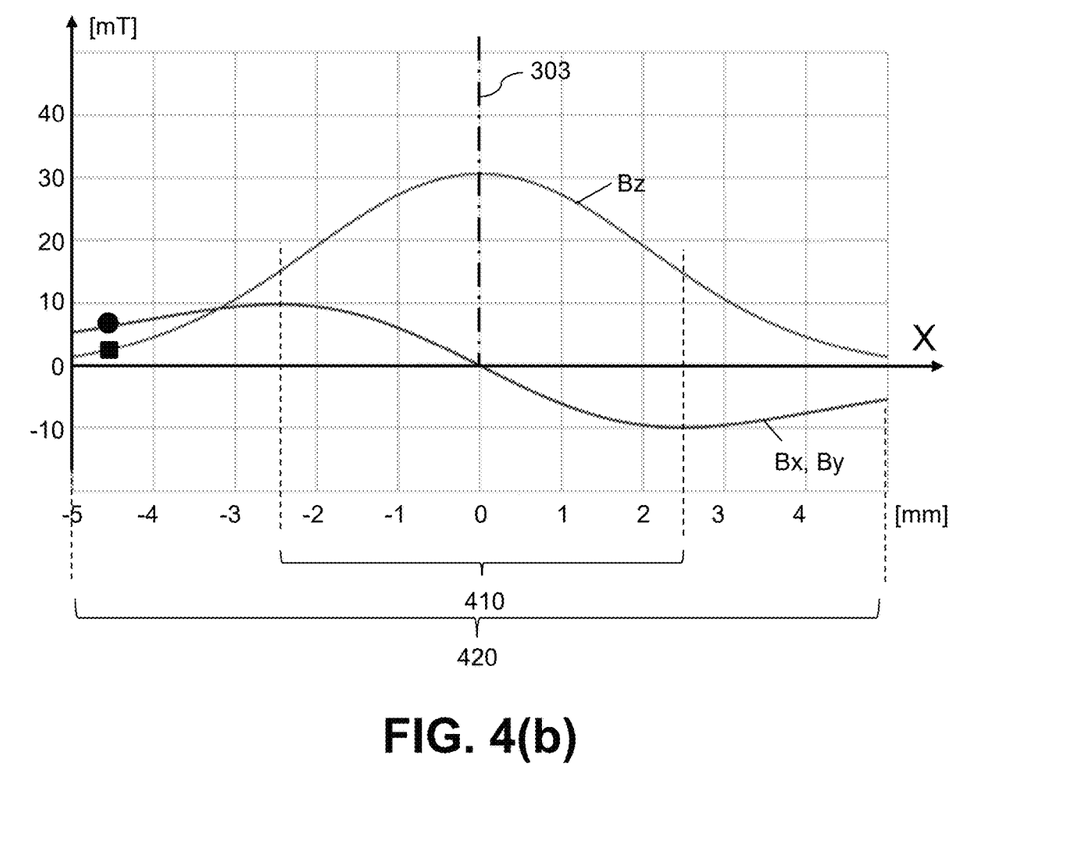
FIG. 4(b) is a graph showing the amplitude of magnetic field components Bx and Bz which can be measured in a plane y at a distance "g" from the magnet, as a function of radial displacement, as can be obtained by computer simulation.

FIG. 4(b) is a graph showing two simulated curves:
 a first curve (labelled with a black square) shows the amplitude of the magnetic field component Bz as a function of radial distance "R" from the magnets main axis 303 in any radial direction. Thus, this curve also represents Bz(x) as a function of x for movements parallel to the X-axis, and also represents Bz(y) as a function of y for movements parallel to the Y-axis.
 a second curve (labelled with a black circle) shows the amplitude of the magnetic field component Bx(x) as a function of x for movements parallel to the X-axis, and also shows By(y) as a function of y for movements parallel to the Y-axis.

These curves can be obtained by simulation using commercially available software tools.

As can be appreciated, the Bx, By and Bz curves are far from quadrature signals in the region 420 (in the example from −5.0 to +5.0 mm), especially when the radial displacement X is larger than the radius R of the magnet (in the example: 2.0 mm).

The inventors discovered however that a scaled and shifted version of Bz, namely c1*(Bz-c2), with properly chosen constants c1, c2, behaves very much like a cosine function, and that a scaled version of Bx and By, e.g. c3*Bx, with a properly chosen constant c3, behaves very much like a sine function, especially in a region 410 (in the example from −2.5 to +2.5 mm). Thus in the region 410, the scaled and shifted version of Bz on the one hand, and a scaled version of Bx and Bz on the other hand, behave very much like quadrature signals. In this region, the Bz component as a function of R can be approximated by a function $Bz(R) \approx c1*(R-c2)$; and the Bx component as a function of X can be approximated by a function $Bx(x) \approx c3*(x)$; and the function By(y) can be approximated by a function $By(y) \approx c3*(y)$, each with an error smaller than 10%, or even smaller than 8%, or even smaller than 6%, or even smaller than 5%. Unfortunately, this does not apply to the range 420.

Figure 4C:
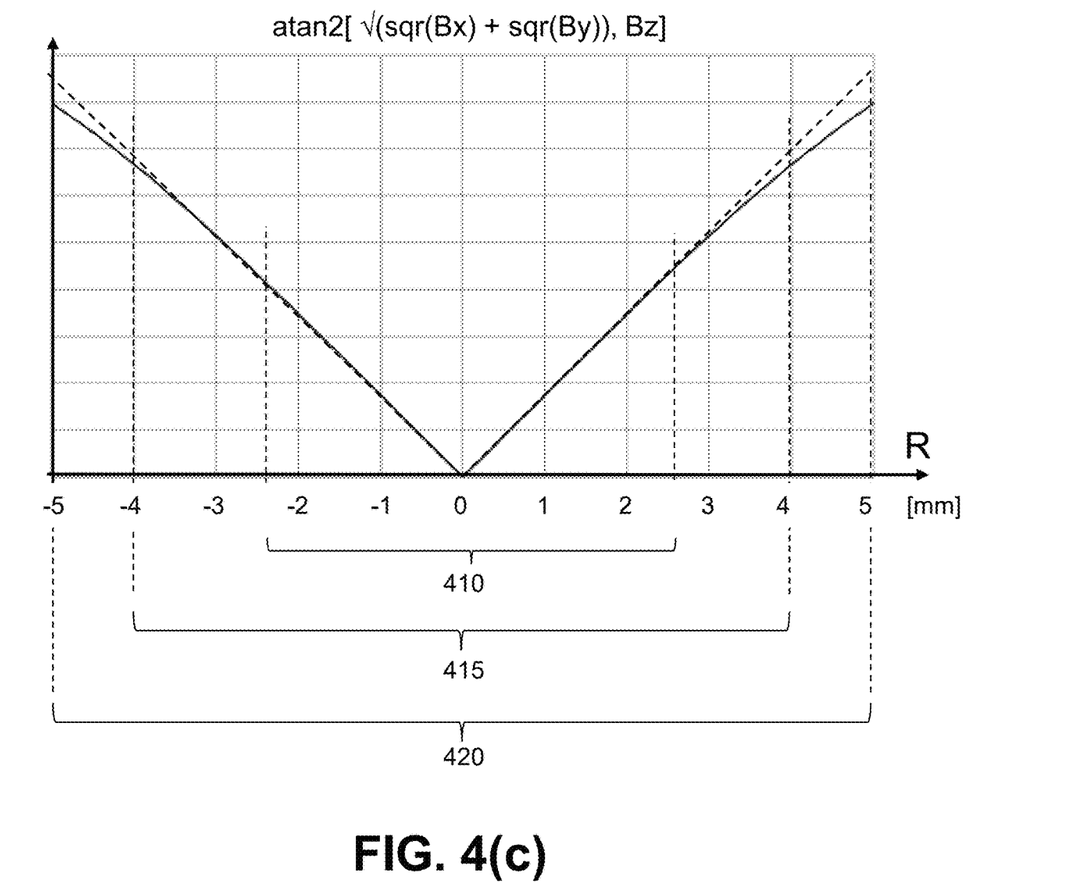
FIG. 4(c) is a graph showing the outcome of the function atan2 [V (sqr(Bx)+sqr(By)), Bz].

The inventors continued experimenting, and very surprisingly discovered that the function atan2 [√(sqr(Bx)+sqr(By)), Bz], illustrated in FIG. 4(c), based on the original Bx, By and Bz signals, without scaling and shifting, is not only highly linear, but moreover, is highly linear in the region 415 from −4.0 to +4.0 mm, i.e. for radial displacements up to twice (2.0 times) the radius of the magnet (in the example the magnet diameter is 4.0 mm), where the error is smaller than about 3%, and even beyond, e.g. in the region from −5.0 to +5.0 corresponding to 2.5 times the radius of the magnet, where the error is smaller than about 8%.

This accuracy is more than good enough for many applications, e.g. for thumbstick applications, but if desired, can be further improved by post-processing, e.g. by using a multi-point linearization function, which can be implemented e.g. by a piece-wise linear approximation function, or using a look-up table with interpolation.

Figure 5A:
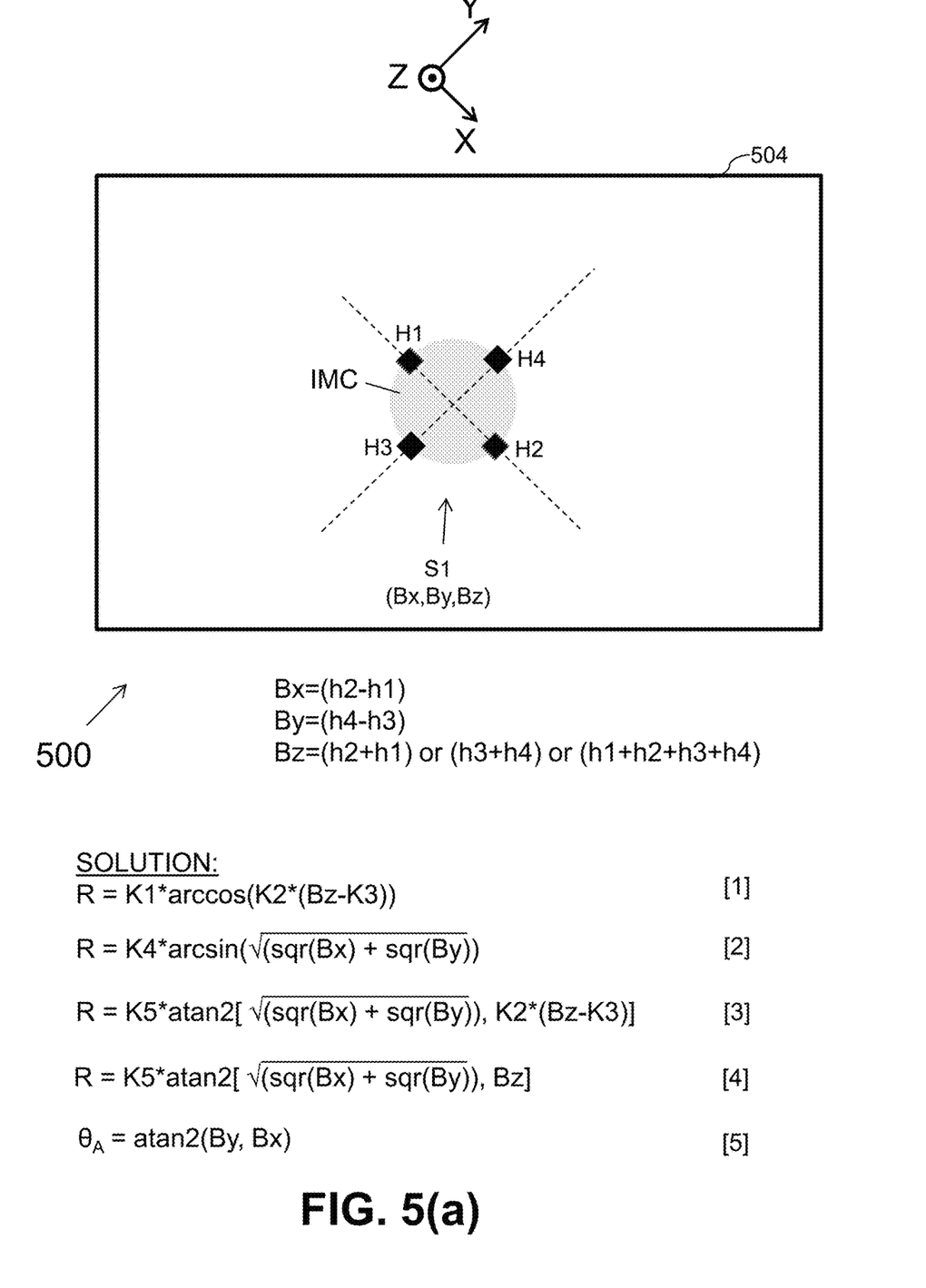
FIG. 5(a) is a schematic representation of a sensor device comprising a 3D magnetic pixel, as can be used in embodiments of the present invention. This 3D magnetic pixel comprises an IMC and four horizontal Hall elements.

FIG. 5(a) is a schematic representation of a sensor device 500 comprising a sensor structure S1, also referred to herein as a "3D magnetic pixel", comprising an integrated magnetic concentrator and four horizontal Hall elements H1 to H4. In the example shown, the X-axis and Y-axis form an angle of 45° with the semiconductor substrate, but that is not important for the invention to work. This magnetic sensor structure is capable of measuring Bx1, and By1 and Bz1 of the magnetic field at a single position, namely at the position X=0 and Y=0, at the center of the disk.

If h1, h2, h3, h4 represent the signals provided by the Hall elements H1, H2, H3, H4 respectively, then Bx can be determined as (h2−h1), By can be determined as (h4−h3), and Bz can be determined as (h2+h1) or as (h3+h4) or as (h1+h2+h3+h4). In fact, there is always a scaling factor involved, related to the sensitivity of the Hall elements, etc., but this scaling factor is ignored here, to keep the description simple, because the signals obtained from the Hall elements need to be amplified anyway. Any of the following formulas can be used for calculating the distance R from the main axis:

$$R = K1 * \arccos(K2 * (Bz - K3)) \quad [1]$$

$$R = K4 * \arcsin(\sqrt{sqr(Bx) + sqr(By)}) \quad [2]$$

$$R = K5 * \mathrm{atan2}[\sqrt{(sqr(Bx) + sqr(By))}, K2 * (Bz - K3)] \quad [3]$$

$$R = K5 * \mathrm{atan2}[\sqrt{(sqr(Bx) + sqr(By))}, Bz] \quad [4]$$

And the following formula can be used to calculate the azimuth angle θ, relative to the X-axis:

$$0 = \mathrm{atan2}(By, Bx) \quad [5]$$

It is an advantage of using formula [1] rather than [2] or [3] because it is computationally less intensive, and only requires the value Bz.

It was found that formula [2] provides excellent results for displacements up to about 125% of the radius of the magnet (i.e. in the region 410).

It was found that formula [1] provides excellent results for displacements up to about 125% of the radius of the magnet (i.e. in the region 410), but also provides good results for radial displacements up to 200% of the radius of the magnet, or even up to 250% of the radius of the magnet.

In an embodiment, the formula [3] is used, with K2 equal to about 0.33, and with K3 equal to about 15. It was found that this formula also provides highly accurate values for displacements up to about 125% of the radius of the magnet (i.e. in the region 410), and acceptable results up to 150% of the radius.

In a preferred embodiment, however, the formula [4] is used, which is a special case of formula [3] with K2=1.0 and K3-0. It is a major advantage of using this formula rather than [1] or [2] or [3] because it involves a division of two values which both increase or both decrease with a varying strength of the magnet, thus this value has a reduced sensitivity to demagnetization effects, temperature variations, etc. In addition, as illustrated in FIG. 4(c), this formula provides excellent results for radial displacement for displacements up to about 200% of the radius of the magnet (i.e. in the region 415), or even up to 250% of the radius (i.e. in the region 420). The accuracy and simplicity of this formula is almost unbelievable, especially when taking into account that the Bz-values does not behave at all like a cosine function anymore, and the Bx, By values do not behave like a sine-function anymore outside the region 410. It is a pure coincidence that both the numerator and denominator and the arctangent function seem to cooperate to provide an excellent result in such a large region.

It is an advantage of using formula [5] because it involves a division of two values which are proportional with the strength of the magnet, hence the ratio is highly insensitive to demagnetization effects, temperature variations, etc.

It is a major advantage of a sensor device having only one 3D pixel, as illustrated in FIG. 5(a), because the area of the silicon substrate can be very small. It is noted in this respect that a typical diameter of the IMC is about 150 to about 250 μm, and a typical width of a horizontal Hall plate is about 15 to about 25 μm.

As mentioned above, formula [4] provides highly accurate results (with error smaller than about 3%) for radial displacements up to 2.0 times the radius of the magnet, and accurate results (with error smaller than about 8%) for radial displacements up to 2.5 times the radius of the magnet.

Figure 5B:
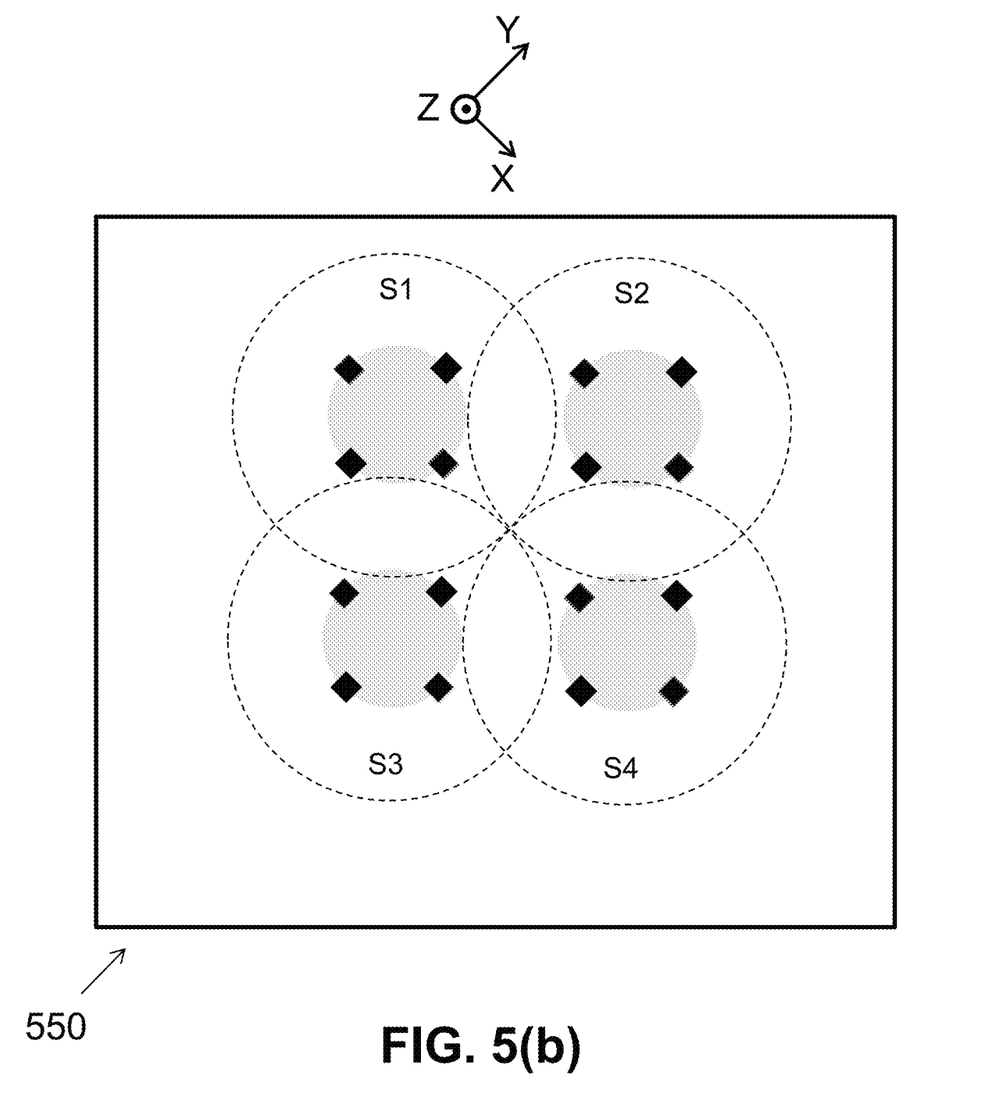
FIG. 5(b) is a variant of FIG. 5(a) comprising multiple 3D magnetic pixels.

If a larger displacement is to be measured with a similar accuracy, the following options may be used:
 a) use formula [4] and [5] with post-processing;
 b) use multiple 3D pixels, for example as illustrated in FIG. 5(b), determine to which of the IMC-centers the magnet is nearest by selecting the 3D pixel providing the highest value for Bz, then using the signals (Bx, By, Bz) from the selected 3D pixel to determine the position of the magnet relative to the selected 3D-pixel, and combining the (known) position of the selected pixel with the position provided by the formulas. These 3D pixels may be implemented on a single semiconductor substrate, or may be implemented on multiple semiconductor substrates, which may be packaged in a single semiconductor device.
 c) using a different magnet, e.g. having a larger diameter D, and/or a larger height H.

FIG. 5(b) is a schematic representation of a sensor device comprising four 3D magnetic pixels, spaced apart on a 2×2 grid. But of course, the present invention is not limited hereto, and sensor devices having less than four, or more than four 3D pixels can also be used.

In a particular embodiment (not shown), the sensor device comprises seven 3D pixels, one located at a central position, the other six located at a virtual circle having the central position as its center, and angularly spaced apart by multiples of 60°.

In the example of FIG. 5(b) having only four 3D pixels, the distance between the centers of S1 and S3 may be a value in the range from about 5.0 mm to about 10.0 mm, and the distance between the centers of S1 and S2 may be a value in the range from about 3.5 mm to about 7.0 mm, but the invention will also work if the distance between the sensor locations are slightly larger.

Figure 6:
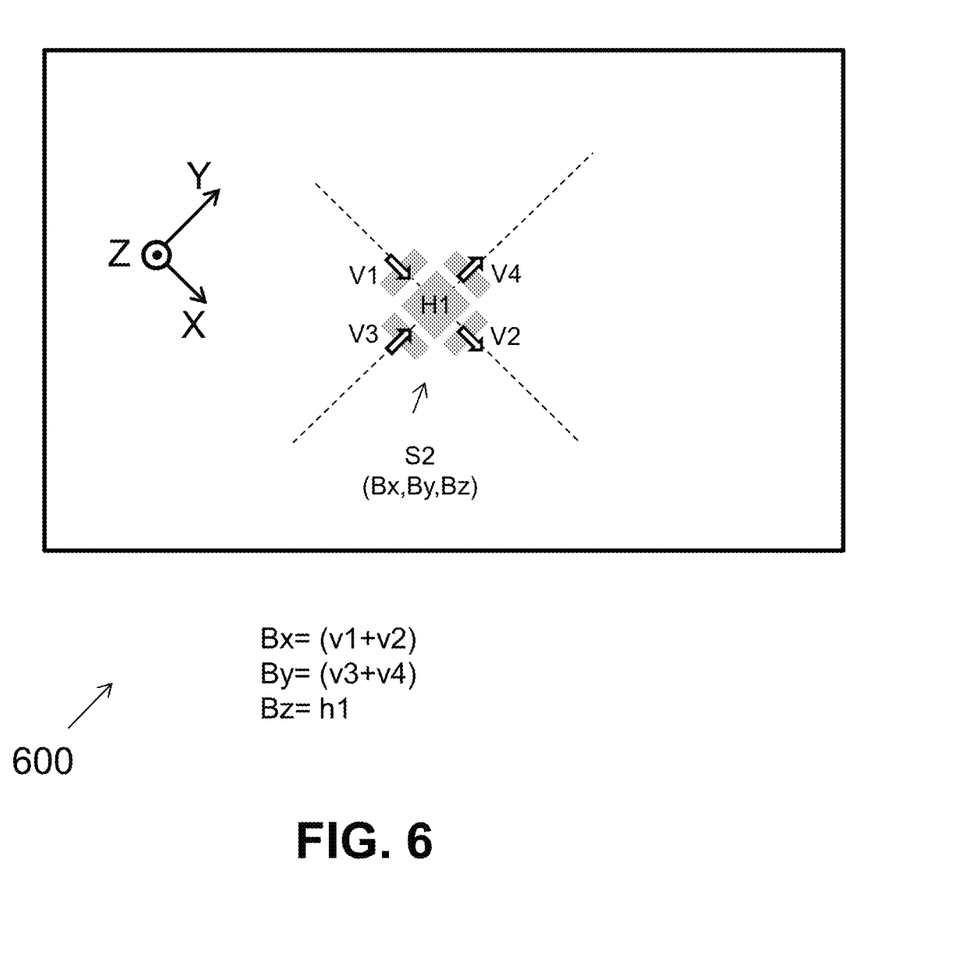
FIG. 6 is a schematic representation of another sensor device comprising a 3D magnetic pixel, as can be used in embodiments of the present invention. This 3D magnetic pixel comprises one horizontal Hall element and four vertical Hall elements.

FIG. 6 is a schematic representation of another sensor device comprising a sensor structure S2, also referred to herein as a "3D magnetic pixel", comprising one horizontal Hall H1 element in the centre, and four vertical Hall elements V1, V2, V3, V4 located around the horizontal Hall element. Two of these vertical Hall elements V1, V2 have an axis of maximum sensitivity oriented in the X-direction. The two other vertical Hall elements V3, V4 have an axis of maximum sensitivity oriented in the Y-direction.

The signal Bx can be obtained by summing the values v1, v2 obtained from the vertical Hall elements V1 and V2, respectively. As mentioned above, any scaling is ignored here, because the signals obtained from the Hall elements need to be amplified anyway. The signal (v1+v2) is equivalent to the signal of Bx that would be measured at the center, where H1 is located. By providing two vertical Hall elements on opposite sides of the horizontal Hall element, the signal Bx can be measured at the same location as Bz(measured by H1), without requiring stacking of multiple substrates. In addition, the signal-to-noise ratio (SNR) of the signal Bx can be improved. Likewise, the signal (v3+v4) is equivalent to the signal of By that would be measured at the center, where H1 is located.

Having determined the values of Bx, By, Bz, the same formulas [1] to [5] mentioned above can then be used to determine the distance R and the azimuth angle θ.

Everything else mentioned above for the sensor device of FIG. 5(a) or FIG. 5(b) or variants thereof, is also applicable here, mutatis mutandis.

For example, in an embodiment, the sensor device may comprise multiple 3D pixels, e.g. three or four or seven 3D pixels, each having a horizontal Hall element and four vertical Hall elements.

Of course, it would also be possible to use magnetoresistive MR elements instead of vertical Hall elements.

Figure 7:
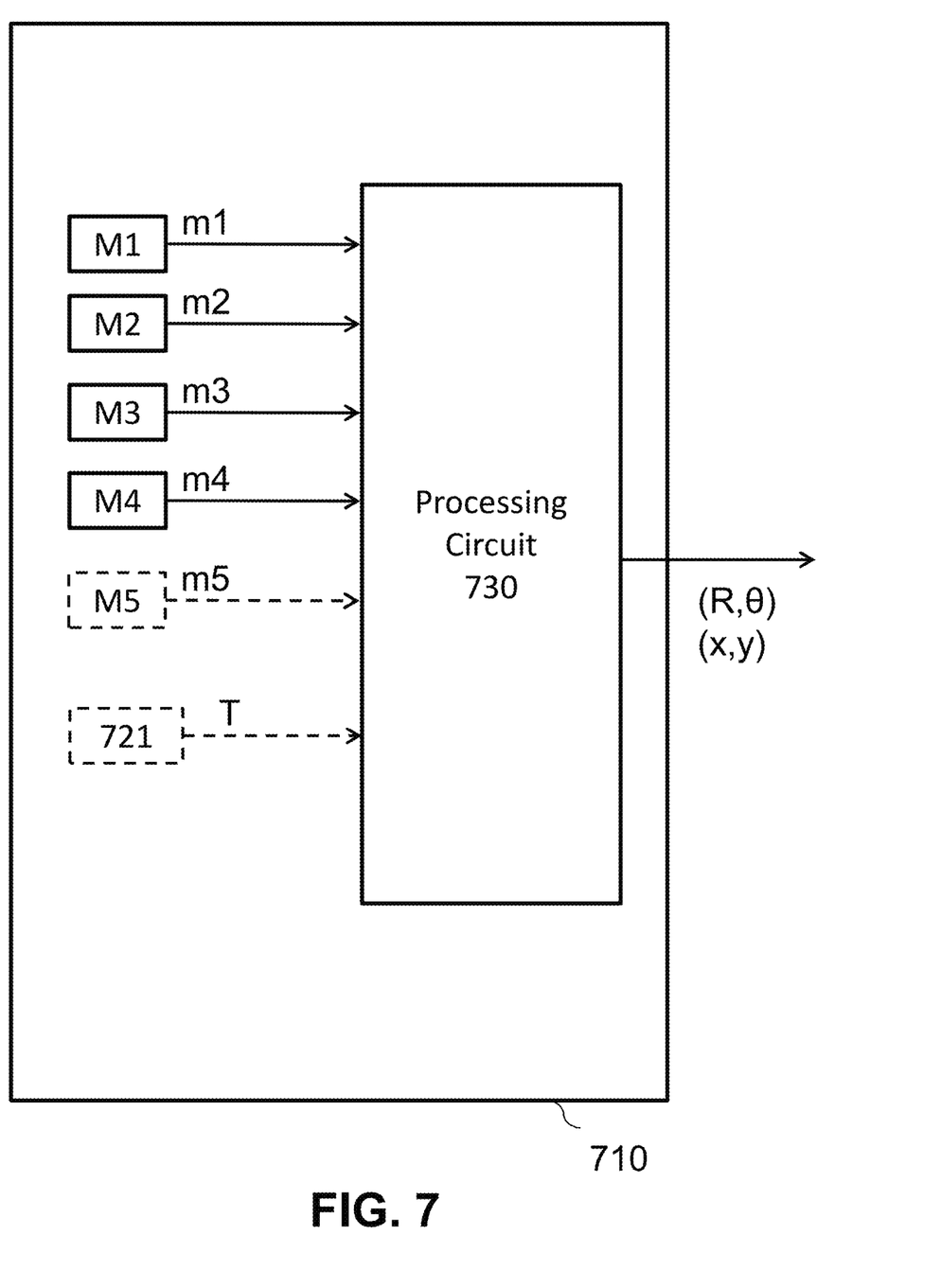
FIG. 7 shows a block-diagram of a sensor device comprising a 3D magnetic pixel such as the one shown in FIG. 5a or FIG. 6.

FIG. 7 shows a block-diagram of a sensor device 710 comprising one or more 3D magnetic pixels such as the one shown in FIG. 5(a) or FIG. 6, or variants thereof, and further comprising a processing circuit 730. The sensor device 710 can be used in a position sensor system 300 such as the one shown in FIG. 3(a).

The position sensor device 710 shown in FIG. 7 comprises a plurality of magnetic sensor elements M1, M2, etc., for example four horizontal Hall elements (e.g. as illustrated in FIG. 5(a)), or one horizontal Hall element and four vertical Hall elements (e.g. as shown in FIG. 6).

The sensor device 710 may optionally further comprise at least one temperature sensor 721, or in case of multiple 3D magnetic pixels, one temperature sensor per 3D pixel, for measuring a temperature of the substrate at said sensor location, for allowing compensation of the measured signals m1, m2, etc. in manners known per se in the art.

While not explicitly shown, the sensor circuit would typically comprise also a biasing and readout circuit, comprising at least one amplifier, analog-to-digital convertor (ADC), etc. Such circuits are well known in the art, are not the focus of the present invention, and hence need not be described in more detail here.

The sensor device 710 further comprises a processing circuit 730, configured for determining said two-dimensional position, based on the signals obtained from the sensor elements. The processing circuit 730 may comprise a programmable processor configured for calculating one or more of the formulas [1] to [5] mentioned above, and provide polar coordinates R and θ, or may convert the polar coordinates into Cartesian coordinates, and provide values x,y.

Figure 8:
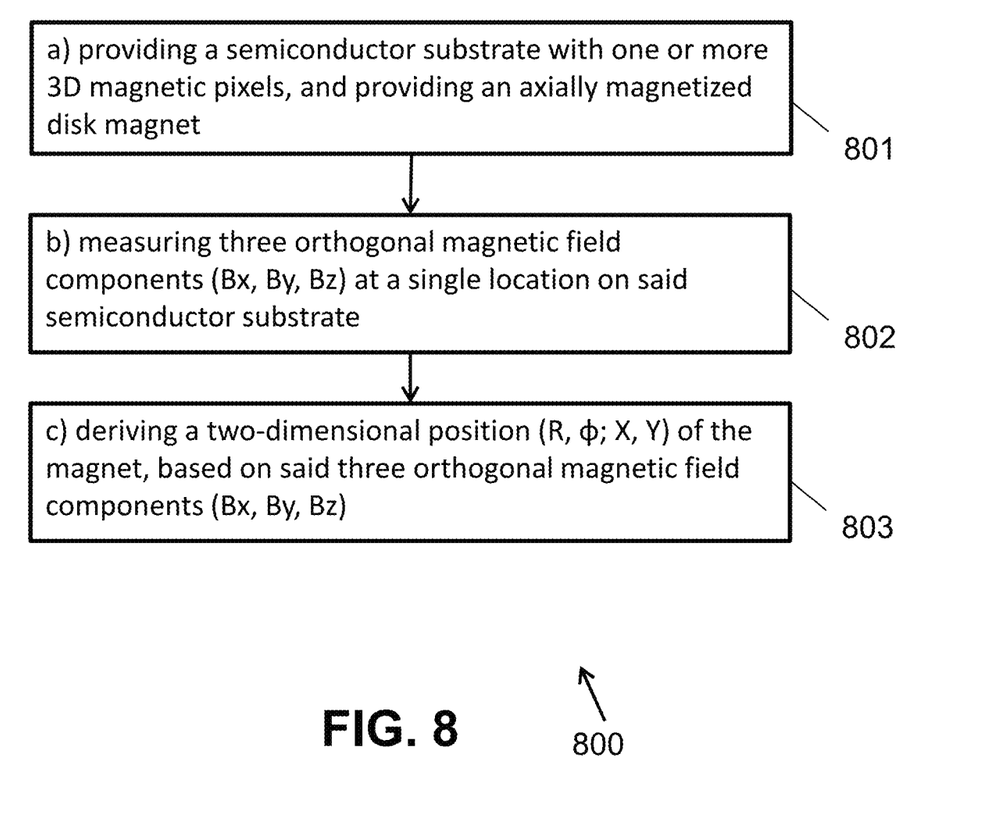
FIG. 8 shows a flow-chart of a method of determining a 2D position of a magnet that is movable in a plane parallel to a semiconductor device, as may be used by the sensor device of FIG. 7.

FIG. 8 shows a flow-chart of a method of determining a 2D position of a magnet that is movable in a plane parallel to a semiconductor device, as may be performed by the sensor device of FIG. 7.

The invention claimed is:

1. A position sensor device for determining a two-dimensional position (R,θ; X, Y) of a magnet which is movable in a plane, and that generates a magnetic field; the position sensor device comprising:
   a semiconductor substrate comprising a plurality of magnetic sensors configured for determining three orthogonal magnetic field components (Bx, By, Bz) at a single location;
   and wherein the semiconductor substrate further comprises a processing circuit configured for determining said two-dimensional position (R,θ; X,Y) based on said three orthogonal magnetic field components (Bx, By, Bz);
   wherein the two-dimensional position is determined as a lateral distance (R) from a predefined position; and as an azimuth angle (θ) with respect to a predefined direction (X); and
      wherein said distance (R) is determined as a first function of a ratio of a first numerator and a first denominator, and at least one of the following options: i) wherein each of the first numerator and the first denominator are a function or expression of at least one magnetic field component (Bx, By, Bz); ii) wherein the first numerator is a function of the in-plane magnetic field components (Bx, By), and the denominator is a function of the out-of-plane magnetic field component (Bz); iii) wherein the first numerator is a function of the sum of squares of the in-plane magnetic field components (Bx, By), and the denominator is a function of the out-of-plane magnetic field component (Bz),
      and said azimuth angle (θ) is determined as a second function of a ratio of a second numerator and a second denominator, and at least one of the following options: iv) wherein each of the second numerator and the second denominator is a function or expression of at least one in-plane magnetic field component (Bx, By); v) wherein the second numerator is one (Bx) of the in-plane magnetic field components (Bx, By), and the second denominator is the other (By) of said in-plane magnetic field components (Bx, By).

2. The position sensor device according to claim 1, wherein said distance (R) is determined in accordance with the following formula:
   R=K5*atan2 [√(sqr(Bx)+sqr(By)), K2*(Bz-K3)], wherein K2, K3, K5 are predefined constants;
   and wherein said azimuth angle (θ) is determined in accordance with the following formula:

θ=atan2(By,Bx).

3. The position sensor device according to claim 1, wherein said distance (R) is determined in accordance with the following formula:
   R=K1*arccos (K2*(Bz-K3)), wherein K1, K2, K3 are predefined constants;

and wherein said azimuth angle (θ) is determined in accordance with the following formula:

θ=atan2(By,Bx).

4. The position sensor device according to claim 1, wherein the plurality of magnetic sensor elements comprise four horizontal Hall elements arranged on a virtual circle, near the periphery of an integrated magnetic flux concentrator (IMC).

5. The position sensor device according to claim 1, wherein the plurality of magnetic sensor elements comprises one horizontal Hall element having an axis of maximum sensitivity in a first direction (Z) oriented perpendicular to the semiconductor substrate;
and two vertical Hall elements having an axis of maximum sensitivity in a second direction (X) parallel to the semiconductor substrate;
and two vertical Hall elements having an axis of maximum sensitivity oriented in a third direction (Y) parallel to the semiconductor surface and perpendicular to the second direction (X).

6. A position sensor device for determining a two-dimensional position (R,θ; X,Y) of a magnet which is movable in a plane, and that generates a magnetic field; the position sensor device comprising:
a semiconductor substrate comprising a plurality of magnetic sensors configured for determining three orthogonal magnetic field components (Bx, By, Bz) at a single location;
and wherein the semiconductor substrate further comprises a processing circuit configured for determining said two-dimensional position (R,θ; X,Y) based on said three orthogonal magnetic field components (Bx, By, Bz);
wherein the magnet is a two-pole, axially magnetized, cylindrical magnet;
wherein the magnet can be laterally moved or shifted in a plane, and its axis is perpendicular to the semiconductor surface.

7. The position sensor system, comprising:
a position sensor device according to claim 6;
said magnet, movably mounted in a plane parallel to the semiconductor substrate of the position sensor device.

8. The position sensor system according to claim 7, further comprising a mechanical assembly comprising or connected to said magnet, and configured for allowing the magnet to move in a direction parallel to said semiconductor substrate, while keeping its axis substantially perpendicular to the semiconductor substrate.

9. The thumbstick assembly comprising a position sensor system according to claim 8, wherein the mechanical assembly further comprises a thumbstick.

10. The position sensor device according to claim 6, wherein the plurality of magnetic sensor elements comprise four horizontal Hall elements arranged on a virtual circle, near the periphery of an integrated magnetic flux concentrator (IMC).

11. The position sensor device according to claim 6, wherein the plurality of magnetic sensor elements comprises one horizontal Hall element having an axis of maximum sensitivity in a first direction (Z) oriented perpendicular to the semiconductor substrate;
and two vertical Hall elements having an axis of maximum sensitivity in a second direction (X) parallel to the semiconductor substrate;
and two vertical Hall elements having an axis of maximum sensitivity oriented in a third direction (Y) parallel to the semiconductor surface and perpendicular to the second direction (X).

12. A method of determining a two-dimensional position (R, θ; X, Y) of a magnet which is movable in a plane parallel to a semiconductor substrate, the method comprising the steps of:
a) measuring three orthogonal magnetic field components (Bx, By, Bz) at a single location on said semiconductor substrate;
b) determining said two-dimensional position (R, θ; X, Y) based on said three orthogonal magnetic field components (Bx, By, Bz); wherein step b) comprises:
i) determining a lateral distance (R) from a predefined reference position in accordance with the following formula: R=K5*atan2(V [sqr(Bx)+sqr(By)], K2*(Bz-K3)), wherein K2, K3, K5 are predefined constants; and
ii) determining an azimuth angle (θ) with respect to a predefined direction (X), in accordance with the following formula: θ=atan2(By, Bx); or
i) determining a lateral distance (R) from a predefined reference position in accordance with the following formula: R=K1*arccos (K2*(Bz-K3)), wherein K1, K2, K3 are predefined constants, and
ii) determining an azimuth angle (θ) with respect to a predefined direction (X), in accordance with the following formula: θ=atan2(By, Bx); or
i) determining a lateral distance (R) from a predefined reference position in accordance with the following formula: R=K4*arcsin (V/sqr(Bx)+sqr(By) 1), wherein K4 is a constant, and
ii) determining an azimuth angle (θ) with respect to a predefined direction (X), in accordance with the following formula: θ=atan2(By, Bx).

* * * * *